US011592309B1

(12) United States Patent
Durairaj et al.

(10) Patent No.: US 11,592,309 B1
(45) Date of Patent: Feb. 28, 2023

(54) METHOD AND SYSTEM FOR DISTRIBUTED DETECTION OF ROAD CONDITIONS AND DAMAGE

(71) Applicant: UIPCO, LLC, San Antonio, TX (US)

(72) Inventors: Ravi Durairaj, San Antonio, TX (US); Gregory Brian Meyer, San Antonio, TX (US); Oscar Roberto Tijerina, San Antonio, TX (US); Sean Carl Mitchem, San Antonio, TX (US); Stacy Callaway Huggar, San Antonio, TX (US); Ruthie D. Lyle, Durham, NC (US); Nathan Lee Post, Rockport, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 95 days.

(21) Appl. No.: 17/158,744

(22) Filed: Jan. 26, 2021

Related U.S. Application Data

(60) Provisional application No. 62/966,079, filed on Jan. 27, 2020.

(51) Int. Cl.
*G06F 16/29* (2019.01)
*G01C 21/34* (2006.01)

(52) U.S. Cl.
CPC ..... *G01C 21/3492* (2013.01); *G01C 21/3461* (2013.01); *G06F 16/29* (2019.01)

(58) Field of Classification Search
CPC . G01C 21/3492; G01C 21/3461; G06F 16/29; G06F 11/079; G06F 11/0709; G06F 11/0751; G06F 11/0787; G06F 11/3006; G06F 11/34; G06F 11/3419; G06F 11/3452; G06F 16/24575; G06F 16/248; G06F 17/30528; G06F 17/30554; G01M 5/0025; G01M 5/00; B60T 2210/14; B60T 2210/36; G06Q 50/26; G06Q 10/10; G06Q 10/101;
(Continued)

(56) References Cited

U.S. PATENT DOCUMENTS 10,824,145 B1 * 11/2020 Konrardy ............... G06F 30/20
2014/0196529 A1 * 7/2014 Cronin .................... E01C 23/06
73/146

FOREIGN PATENT DOCUMENTS

CN 107463141 A * 12/2017 ............... B60Q 1/20

* cited by examiner

*Primary Examiner* — Hai Phan
*Assistant Examiner* — Anthony D Afrifa-Kyei
(74) *Attorney, Agent, or Firm* — Plumsea Law Group, LLC

(57) ABSTRACT

Methods and systems for distributed detection of road conditions and damage are described. In one embodiment, a method for distributed detection of road conditions and damage is provided. The method includes receiving, from one or more mobile devices, a plurality of reports of anomalies associated with roads in a geographic area. The method also includes storing the received reports of anomalies in a database and comparing each report of an anomaly to stored reports of previous anomalies in the database. The method further includes determining whether each report of an anomaly indicates road damage or a temporary problem. The method includes generating a prioritized list of locations of anomalies associated with one or more roads that have been determined to have road damage that needs maintenance and/or repair.

20 Claims, 8 Drawing Sheets

(58) Field of Classification Search
CPC .. G06Q 10/103; G06Q 10/105; G06Q 10/107; G06Q 10/109; G06Q 30/02; H04L 41/0631; H04L 41/0681; H04L 43/045; H04L 43/06
See application file for complete search history.

METHOD AND SYSTEM FOR DISTRIBUTED DETECTION OF ROAD CONDITIONS AND DAMAGE

CROSS-REFERENCE TO RELATED APPLICATION(S)

This application claims the benefit of U.S. Provisional Patent Application Ser. No. 62/966,079 filed on Jan. 27, 2020 and titled "Method and System for Distributed Detection of Road Conditions and Damage", the disclosure of which application is incorporated by reference in its entirety.

BACKGROUND

The present embodiments relate to road maintenance in general, and more particularly, to methods and systems for distributed detection of road conditions and damage.

Drivers on roads can encounter a variety of detrimental road conditions and damage that can be potentially hazardous to vehicles or occupants, such as potholes, objects on the road, uneven road surfaces, etc. Conventionally, awareness of these dangerous road conditions only occurs when a driver or other person calls a government or municipal agency to report the road condition. Maintaining roads in a large metropolitan area poses several challenges. In particular, in areas with many roads of various types, assessing and locating problem areas on those roads can be time consuming. Potholes or other road damage that is severe enough to require immediate attention or repair must first be identified and located. Drivers who report potholes or other dangerous road conditions may be unable to provide accurate descriptions or identification of the location of the road damage.

Accordingly, there is a need in the art for a system and method that addresses these shortcomings discussed above.

SUMMARY

In one aspect, a method for distributed detection of road conditions and damage is provided. The method includes receiving, from one or more mobile devices, a plurality of reports of anomalies associated with roads in a geographic area. The method also includes storing the received reports of anomalies in a database and comparing each report of an anomaly to stored reports of previous anomalies in the database. The method further includes determining whether each report of an anomaly indicates road damage or a temporary problem. The method includes generating a prioritized list of locations of anomalies associated with one or more roads that have been determined to have road damage that needs maintenance or repair.

In another aspect, a method for implementing road maintenance and/or repair of one or more roads in a geographic area is provided. The method includes, receiving, from one or more mobile devices, a plurality of reports of anomalies associated with roads in a geographic area. The method also includes generating a prioritized list of locations of anomalies associated with one or more roads that have been determined to have road damage that needs maintenance or repair and providing the prioritized list of locations of anomalies associated with the one or more roads to a municipal agent configured to implement maintenance or repair of the roads in the geographic area. The anomalies associated with the one or more roads are repaired according to the prioritized list of locations such that a highest priority anomaly is repaired prior to a next highest priority anomaly.

In another aspect, a system for distributed detection of road conditions and damage is provided. The system includes a plurality of mobile devices associated with vehicles traveling along roads in a geographic area. The system also includes a server including a processor in communication with the plurality of mobile devices via a communication network. The processor of the server is configured to receive, from the plurality of more mobile devices, a plurality of reports of anomalies associated with the roads in the geographic area. The processor is also configured to store the received reports of anomalies in a database and compare each report of an anomaly to stored reports of previous anomalies in the database. The processor is further configured to determine whether each report of an anomaly indicates road damage or a temporary problem. The processor of the server is configured to generate a prioritized list of locations of anomalies associated with one or more roads that have been determined to have road damage that needs maintenance or repair.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the principles of the example embodiments described herein, a method and system for distributed detection of road conditions and damage are provided. The techniques of the present embodiments provide a mechanism for prioritizing road maintenance and repairs based on detection information received from motor vehicles.

Figure 1:
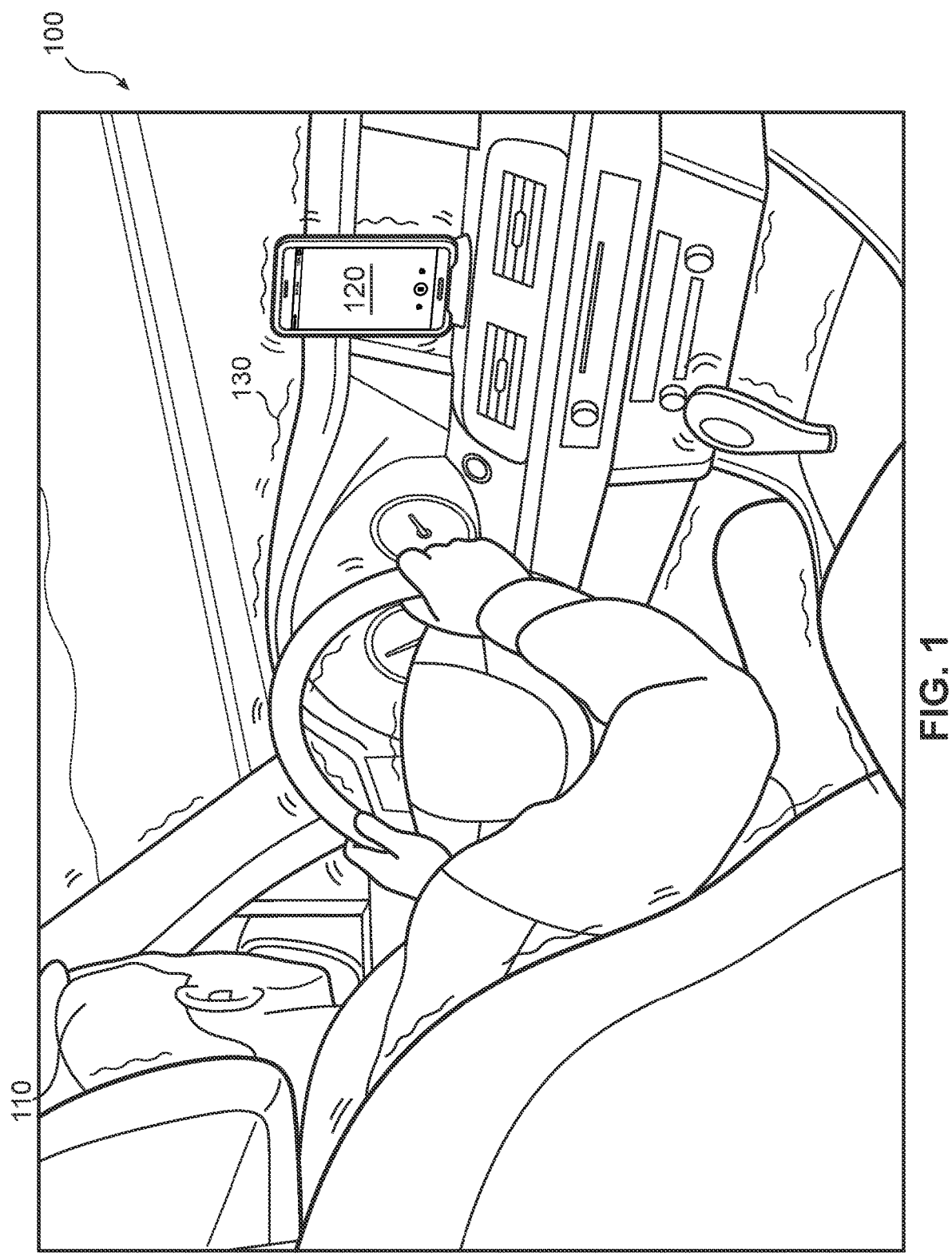
FIG. 1 is a schematic view of an example embodiment of a motor vehicle experiencing abnormal road conditions.

FIG. 1 illustrates an example embodiment of a motor vehicle 100 for distributed detection of road conditions and damage. In an example embodiment, motor vehicle 100

(also referred to herein as "vehicle 100") includes components configured to detect various information associated with road conditions as vehicle 100 travels along one or more roads. In this embodiment, a driver or user 110 is traveling in vehicle 100 along a road that includes one or more road surface irregularities or anomalies. According to the techniques described herein, a mobile device 120 may be used to detect these road surface irregularities or anomalies and report them to a central database or road maintenance network.

For example, as shown in FIG. 1, as vehicle 100 travels along the road, vehicle 100 experiences a series of vibrations 130 that may be caused by one or more road surface irregularities or anomalies on the road. In this embodiment, mobile device 120 associated with driver or user 110 is provided in vehicle 100 and is configured to detect or sense vibrations 130. In some embodiments, mobile device 120 may be provided with one or more sensors that can detect or sense shocks or vibrations 130, such as an accelerometer, gyroscope, G-sensor, or vibration sensor, experienced by vehicle 100.

For example, mobile device 120 may detect or sense acceleration or displacement in the vertical direction that is associated with the road surface irregularities or anomalies on the road on which vehicle 100 is traveling. Additionally, mobile device 120 may be configured to measure the value or amount of acceleration or displacement associated with vibrations 130 experienced by vehicle 100. In other embodiments, vehicle 100 may include additional sensors located within vehicle 100 that are configured to measure or detect shocks or vibrations.

Figure 2:
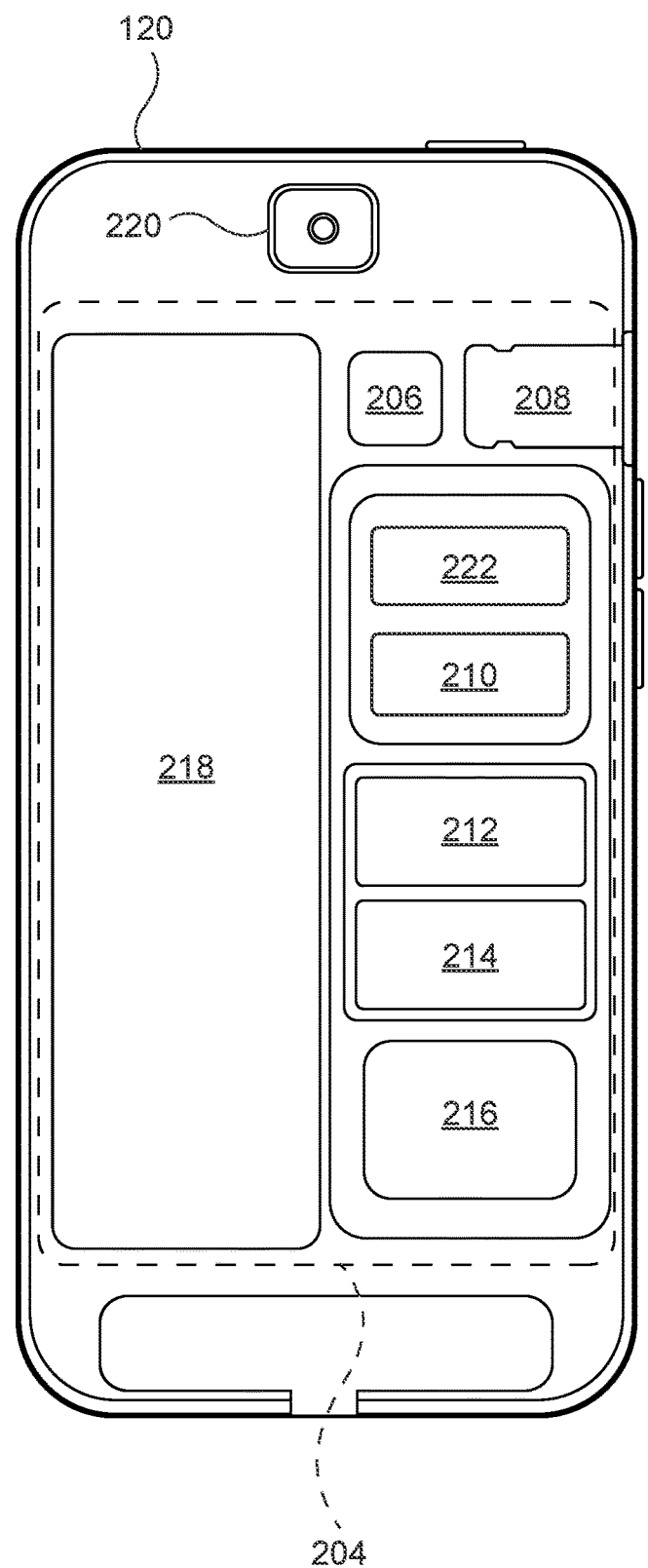
FIG. 2 is a schematic view of an example embodiment of a mobile device.

Referring now to FIG. 2, an example embodiment of mobile device 120 that may be used to detect or sense road surface irregularities or anomalies is shown. In an example embodiment, mobile device 120 is associated with or belongs to the driver or user (e.g., user 110) of vehicle 100 in which mobile device 120 is arranged. With this configuration, mobile device 120 may detect or sense parameters associated with vibrations 130 caused by one or more road surface irregularities or anomalies on the road on which vehicle 100 is traveling.

In this embodiment, mobile device 120 is a cellphone or smart phone. Mobile device 120 includes a plurality of components typically found in a cellphone or smart phone, including, as shown in FIG. 2, at least a display 204, a global positioning system (GPS) sensor 206, a subscriber identity module or subscriber identification module (SIM) 208, a processor 210, a communication module 212 (e.g., for enabling various wireless network communications, such as via code division multiple access (CDMA) and/or global system for mobile communications (GSM) networks, as well as one or more of Bluetooth, WiFi, and/or other wireless communication technologies), a connection module 214 (e.g., to enable wired connections, such as via universal serial bus (USB), Lightning connector, etc.), a memory 216, and a battery 218.

In an example embodiment, mobile device 120 may also include at least one camera 220 or other image sensor and an accelerometer 222 or other type of shock or vibration sensor. In some embodiments, accelerometer 222 and/or other types of shock or vibration sensors in mobile device 120 may be used to detect, sense, and/or measure parameters associated with one or more road surface irregularities or anomalies on the road on which vehicle 100 is traveling, such as vibrations (e.g., vibrations 130), shocks, accelerations, or other quantities associated with accelerations or displacements in the vertical direction experienced by a vehicle when driving over the road surface irregularities or anomalies.

It should understood that mobile device 120 and its respective components described above is merely exemplary and any type of suitable mobile device or device installed within a vehicle may be used to detect, sense, and/or measure parameters associated with the road surface irregularities or anomalies as described herein.

Figure 3:
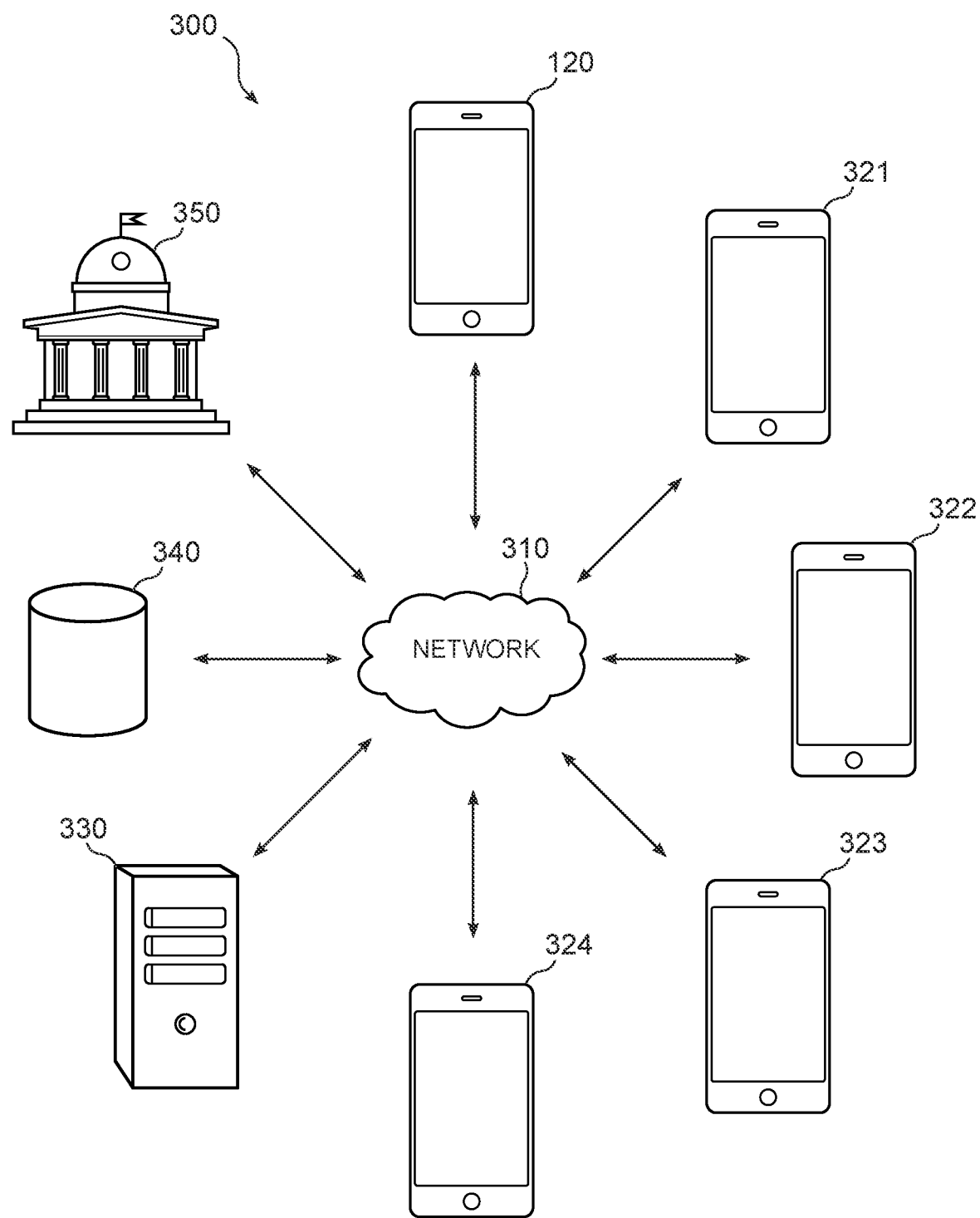
FIG. 3 is a schematic diagram of components of a system for distributed detection of road conditions interacting with a network.

In some embodiments, information associated with road surface irregularities or anomalies on a plurality of roads in a geographic area, such as a city, town, region, etc., may be obtained from multiple sources (e.g., multiple vehicles including mobile devices) and collected by a central network. The collected information about the road surface irregularities or anomalies on the roads may then be used by the network to prioritize road maintenance or repairs. Referring now to FIG. 3, a system 300 for distributed detection of road conditions interacting with a network 310 is shown.

In an example embodiment, system 300 includes a plurality of mobile devices used by different users to collect information associated with road surface irregularities or anomalies on the roads within the geographic area of interest (i.e., city, town, region, etc.). For example, as shown in FIG. 3, system 300 includes mobile device 120 (e.g., first mobile device 120) associated with user 110, as described above in reference to FIG. 1. In addition, in this embodiment, system 300 also includes a plurality of other mobile devices, including at least a second mobile device 321, a third mobile device 322, a fourth mobile device 323, and a fifth mobile device 324, that are similarly configured to collect or obtain data associated with road surface irregularities or anomalies. Each of mobile device 321, 322, 323, 324 may be associated with a separate user for that device and an associated vehicle in which the user drives along the roads and detects or senses parameters associated with shocks or vibrations caused by road surface irregularities or anomalies on the road on which the respective vehicle is traveling.

While five mobile devices are shown in the example depicted in FIG. 3, it should be understood that in various embodiments, information or data about road surface irregularities or anomalies may be collected or obtained by system 300 from a large number of mobile devices. For example, in a given geographic area, system 300 may receive information about road conditions from hundreds, thousands, or more individual mobile devices or users, as well as information or data from vehicle fleets, such as shipping or delivery services, ride-sharing services, etc.

In an example embodiment, information or data about road surface irregularities or anomalies detected, sensed, and/or measured by mobile devices 120, 321, 322, 323, 324 may be collected or obtained by system 300 via network 310. For example, network 310 may use wireless communication technology to communicate with the mobile devices and receive the information or data about road surface irregularities or anomalies. In addition, information associated with the mobile device or vehicle that detected or sensed road surface irregularities or anomalies may also be obtained, including, but not limited to type of vehicle, make, model, year, sensors used to detect the road surface irregularities or anomalies (e.g., acceleration sensor, G-force sensor, etc.), as well as other vehicle characteristics or properties.

In some embodiments, system 300 may include a server 330, which may be a computer including at least one processor that is configured to execute instructions for implementing the techniques according to the example embodiments described herein. For example, server 330 may be configured to analyze the collected information received via network 310 about the road surface irregularities or anomalies for the plurality of roads in the geographic area from the various mobile devices or vehicles to determine priority for initiating road maintenance and repairs.

In an example embodiment, the collected information received via network 310 about the road surface irregularities or anomalies for the plurality of roads in the geographic area from the various mobile devices or vehicles may be stored in a database 340 that can be accessed by server 330 (e.g., through network 310). Additionally, in some embodiments, system 300 may further include a municipal agent 350, such as a governmental agency or office. Municipal agent 350 may also contribute information or data about road surface irregularities or anomalies to system 300, for example, as collected by governmental vehicles, such as mail delivery vehicles, law enforcement vehicles, fire and rescue vehicles, or other municipal vehicles.

In some embodiments, municipal agent 350 may establish or provide a policy or ranking to server 330 for determining the priority for initiating road maintenance and repairs on the various roads with the geographic area for which information or data has been collected by system 300. For example, municipal agent 350 may be a governmental agency or other entity, including contractors or service providers, in charge of road maintenance. With this arrangement, the information or data about road surface irregularities or anomalies collected by system 300 via network 310 from the mobile devices (e.g., mobile devices 120, 321, 322, 323, 324) may be analyzed by server 330 to determine which roads need maintenance or repair more urgently than other roads in the geographic area. Accordingly, the process of implementing road maintenance and repairs can be made more efficient and effective than the conventional techniques.

In some embodiments, the road surface irregularities or anomalies described herein can include, but are not limited to: sinkholes, potholes, or other dangerous road conditions or damage, such as broken pavement, loose gravel or debris, uneven road surfaces (for example, caused by a divot, a sink, a depression, a hollow, a bump, a crack, a rise, a heave, etc.), or other irregularities or problems with a road. In other embodiments, road surface irregularities or anomalies can further include related surfaces or structures, such as curbs, medians, dividers, speed bumps, shoulders, break down lanes, etc.

Figure 4:
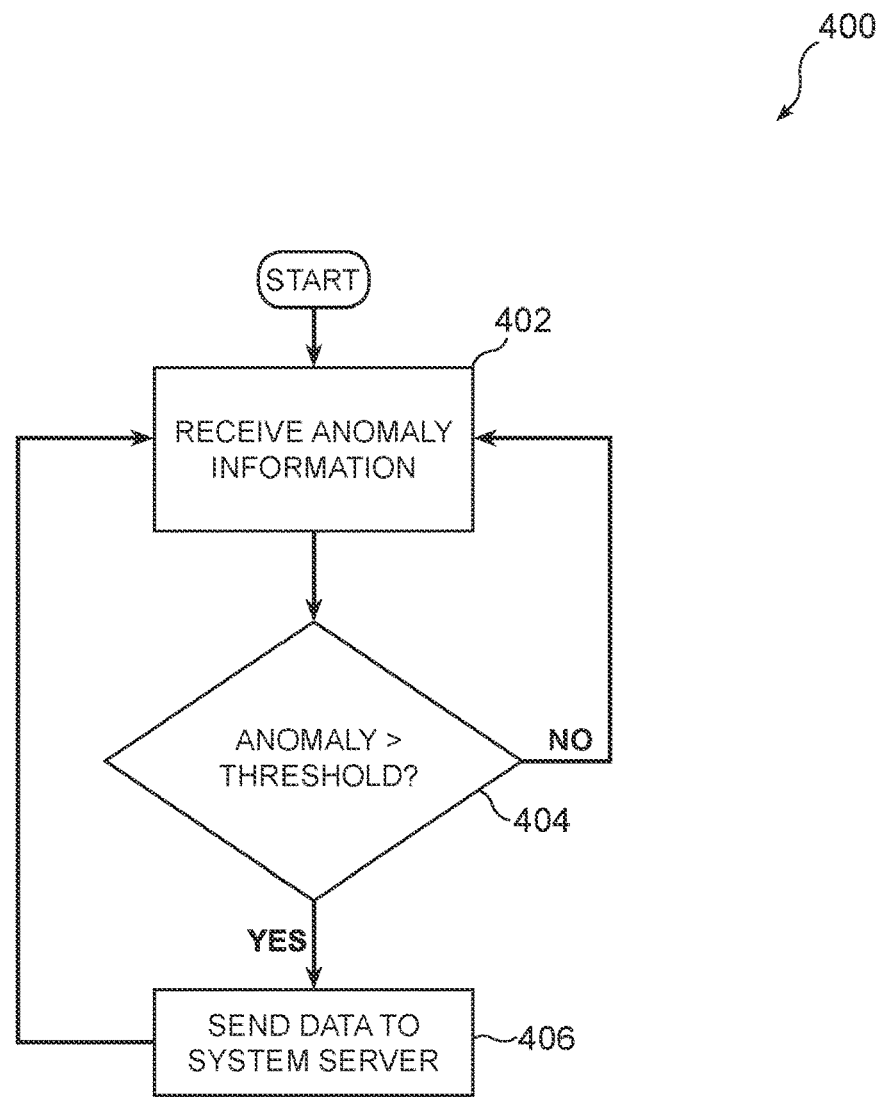
FIG. 4 is a flowchart of an example embodiment of a method for detecting an anomaly in road conditions.

Referring now to FIG. 4, a flowchart of an example embodiment of a method 400 for detecting an anomaly or road surface irregularities associated with a road is shown. In an example embodiment, method 400 may be implemented by a mobile device (e.g., any one or more of mobile devices 120, 321, 322, 323, 324, described above). In other embodiments, method 400 may be additionally or alternatively implemented by other devices or sensors that are configured to measure or detect shocks or vibrations as a vehicle travels along a road.

In this embodiment, method 400 begins at an operation 402 where the anomaly information is received. At operation 402, the anomaly information or data may include parameters associated with one or more road surface irregularities or anomalies on the road on which a vehicle is traveling, such as vibrations, shocks, accelerations, or other quantities associated with accelerations or displacements in the vertical direction experienced by a vehicle when driving over the road surface irregularities or anomalies, as described above.

Next, method 400 includes an operation 404 where the received anomaly information from operation 402 is compared to a threshold value. For example, at operation 404, the received anomaly information may be a value or amount of vibration or shock (i.e., a measured quantity from an accelerometer or other sensor) that is compared to the threshold value that is selected to distinguish between "normal" or routine vibrations or shocks that a vehicle may experience when driving over a road from a vibration or shock caused by an uneven or irregular road surface. In some cases, the threshold value may be a fixed predetermined amount. In other cases, the threshold value may vary from road to road, depending on the specifics or particular configuration or arrangement of the road, such as materials, composition, curvature, elevation, etc.

Upon determining at operation 404 that the received anomaly information from operation 402 does not exceed the threshold value (e.g., the result of operation 404 is "NO"), then method 400 may proceed back to operation 402 until the next iteration of anomaly information is received. Upon determining at operation 404 that the received anomaly information from operation 402 does exceed the threshold value (e.g., the result of operation 404 is "YES"), then method 400 proceeds to an operation 406. At operation 406, the information or data associated with the anomaly or road surface irregularity is sent to the server associated with the system for distributed detection of road conditions and damage. For example, at operation 406 the information or data may be sent to server 330 of system 300 via network 310. Additionally, in some embodiments, the information or data associated with the anomaly or road surface irregularity may also be sent to database 340 for storage and collection with additional information or data obtained from other mobile devices and/or vehicles.

With this arrangement, method 400 provides a technique for distributed detection of road conditions and damage that obtains or collects road surface irregularity or anomaly information from a plurality of mobile devices and/or vehicles traveling on roads in a geographic area that may be used for determining prioritization of road maintenance and repair.

Figure 5:
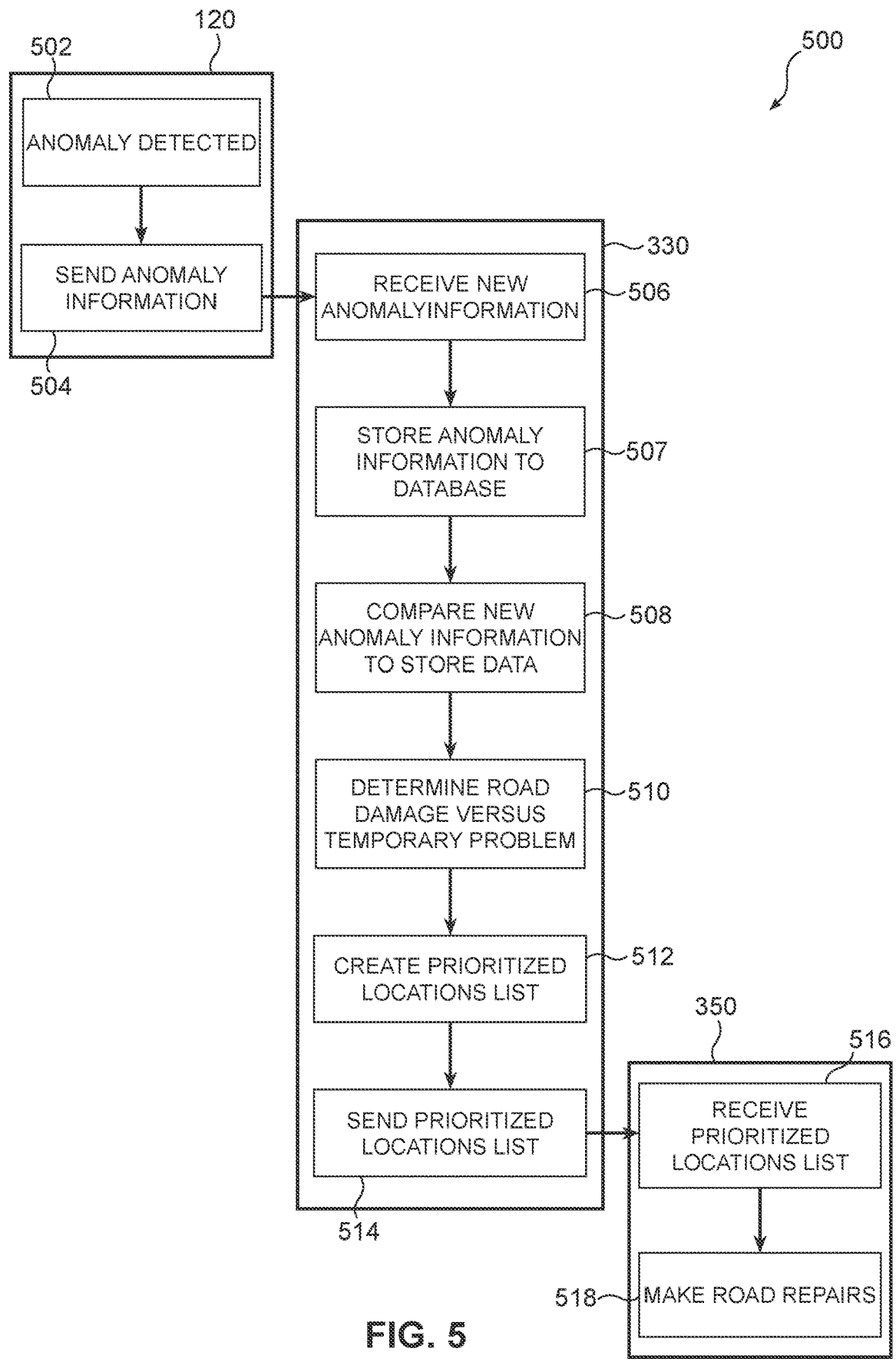
FIG. 5 is a flowchart of an example embodiment of a method for a system to detect anomalies in road conditions for repair.

Referring now to FIG. 5, a flowchart of an example embodiment of a method 500 for a system to detect anomalies in road conditions for maintenance and/or repair is shown. In an example embodiment, method 500 is implemented by system 300 for distributed detection of road conditions. In this embodiment, system 300 includes one or more mobile devices, such as representative mobile device 120, server 330, and municipal agent 350. It should be understood that system 300 may include additional mobile devices and/or vehicles, such as mobile devices 321, 322, 323, 324, described above, as well as other devices and/or vehicles.

In some embodiments, method 500 includes operations that are performed by different components of system 300. In this embodiment, method 500 may begin at an operation 502 where an anomaly or road surface irregularity is detected or sensed by mobile device 120. Method 500 further includes an operation 504 where the anomaly information or data from operation 502 is sent to server 330, for example, wirelessly via network 310. In an example embodiment, mobile device 120 may implement method 400 to determine whether or not the anomaly information detected at operation 502 should be sent to server 330 at operation 504 (e.g., by comparing the anomaly information to a threshold value, as described above).

Method 500 includes operations 502, 504 performed by representative mobile device 120, and it should be understood that method 500 may further include multiple similar operations performed by other mobile devices and/or vehicles that are part of system 300. Collectively, these distributed devices and/or vehicles communicate or send their detected information or data associated with road surface irregularities or anomalies to server 330 (e.g., via network 310) for use in building a database of road surface irregularities or anomalies, such as database 340, described above.

Next, method 500 includes operations performed by server 330. In this embodiment, method 500 includes an operation 506 where server 330 receives the anomaly or road surface irregularity information from mobile device 120. At an operation 507, server 330 stores the anomaly or road surface irregularity information, for example, in database 340. Method 500 may further proceed to an operation 508. At operation 508, the new anomaly or road surface irregularity information received from mobile device 120 is compared to previously stored information associated with the same road in database 340.

For example, at operation 508, server 330 may determine that the anomaly or road surface irregularity information received from mobile device 120 relates to an existing anomaly or road surface irregularity stored in database 340. Alternatively, at operation 508, server 330 may determine that the anomaly or road surface irregularity information received from mobile device 120 is not already included in database 340, in which case, server 330 may create or generate a new entry in database 340 that is associated with the anomaly or road surface irregularity.

In some embodiments, operation 508 may include artificial intelligence (AI) or machine-learning (ML) based comparison techniques. For example, at operation 508 the received anomaly or road surface irregularity information may include one or more of images, signals (e.g., vibration and/or acceleration values), GPS encoding (i.e., to resolve multiple reports from the same location by using GPS coordinates to distinguish between slight differences in the anomaly location), or other information that can be compared or analyzed using AI/ML comparison techniques.

Additionally, in some cases, at operation 508 the comparison may determine a situation where multiple anomalies are reported from the same location, and in fact are two different anomalies or road surface irregularities that need to be individually resolved, such as a series of two or more potholes located near each other on the road.

Next, method 500 further includes an operation 510. At operation 510, server 330 determines whether the anomaly or road surface irregularity information received from mobile device 120 indicates a problem with the road, such as road damage, potholes, road surface irregularities, etc., or whether the information indicates a temporary problem with the road. For example, at operation 510, server may compare the received information to a predetermined threshold value to determine whether the information indicates road damage or a temporary problem. In some embodiments, the predetermined threshold value may be a number of reports received from mobile devices. For example, if three or more mobile devices report the same anomaly or road surface irregularity information on the same portion of the road, server 330 may determine that the information indicates road damage.

In other embodiments, the predetermined threshold value may relate to different criteria. For example, the predetermined threshold value may be time-based, so that a set number of reports from mobile devices within a time window or range may indicate road damage versus a temporary problem. The predetermined threshold value may further relate to a magnitude or amount of acceleration or shock experienced by the mobile devices. For example, a measured value for the shock or vibrations experienced by a mobile device that exceeds the predetermined threshold value (which may be a different value than the amount used as part of method 400, described above) may be used by server 330 to determine between road damage and a temporary problem. In still other embodiments, other criteria may be used by server 330 to distinguish between road damage and a temporary problem, including combinations of criteria described above, or different criteria that may be based on the particular characteristics of the road on which the anomaly or road surface irregularity information has been detected.

Method 500 further includes an operation 512, where server 330 creates a prioritized list of locations of anomalies or road surface irregularities that have been determined to need maintenance and/or repair. In some embodiments, various factors may be considered for determining the prioritization of the locations of anomalies or road surface irregularities that need maintenance and/or repair. For example, factors considered to determine priority can include any one, or combinations thereof, of the following: number of reports (roads with larger numbers of reports of anomalies from mobile devices are given a higher priority than those with smaller numbers of reports), severity (anomalies with more severe damage, for example, based on measured magnitude or values for shock or vibration, may be prioritized over less severe damage), road types (certain types or categories of roads may be prioritized over other roads, for example, based on road classes, number of lanes, speed limits, etc.), types of vehicles reporting (large vehicles, such as trucks or commercial vehicles versus smaller vehicles, such as passenger cars, etc.), time (older reports can be given higher priority than newer reports), type of damage (some types of damage may be prioritized over other types, for example, sinkholes or potholes in a road may be prioritized over cracks or loose debris), as well as other factors that may be used by server 330 to determine the prioritized list of locations of anomalies or road surface irregularities at operation 512.

Other criteria may also be used to determine or establish priority for repairs, such as anticipated traffic patterns resulting from city planning and/or current traffic patterns. For example, roads in areas of a city or other jurisdiction where increased traffic patterns or traffic density are expected may be prioritized in anticipation of increased usage.

Additionally, in some embodiments, the prioritized list of locations of anomalies or road surface irregularities at operation 512 may be determined by server 330 implementing a policy stored or associated with server 330. The policy may include a set of rules or factors, which may be weighted, that server 330 uses to determine the prioritized list of locations of anomalies or road surface irregularities at operation 512. In an example embodiment, the policy implemented by server 330 may be determined or established by a governmental entity, such as municipal agent 350, described above. In other embodiments, the prioritized list of locations of anomalies or road surface irregularities at operation 512 may be determined manually or using other techniques.

Upon completion of the prioritized list of locations at operation 512, method 500 includes an operation 514 where server 330 sends the list to municipal agent 350. At an operation 516, municipal agent 350 receives the prioritized list of locations of anomalies or road surface irregularities from server 330. Method 500 further includes an operation 518, where one or more road repairs or maintenance are carried out by municipal agent 350 based on the prioritized list of locations of anomalies or road surface irregularities. That is, at operation 518, the locations and/or roads with higher priority on the prioritized list are repaired before the locations and/or roads with lower priority With this arrangement, method 500 provides a technique for distributed detection of road conditions and damage that obtains or collects road surface irregularity or anomaly information from a plurality of mobile devices and/or vehicles traveling on roads in a geographic area so that roads in need of maintenance or repair more urgently than other roads in the geographic area may be prioritized.

Figure 6:
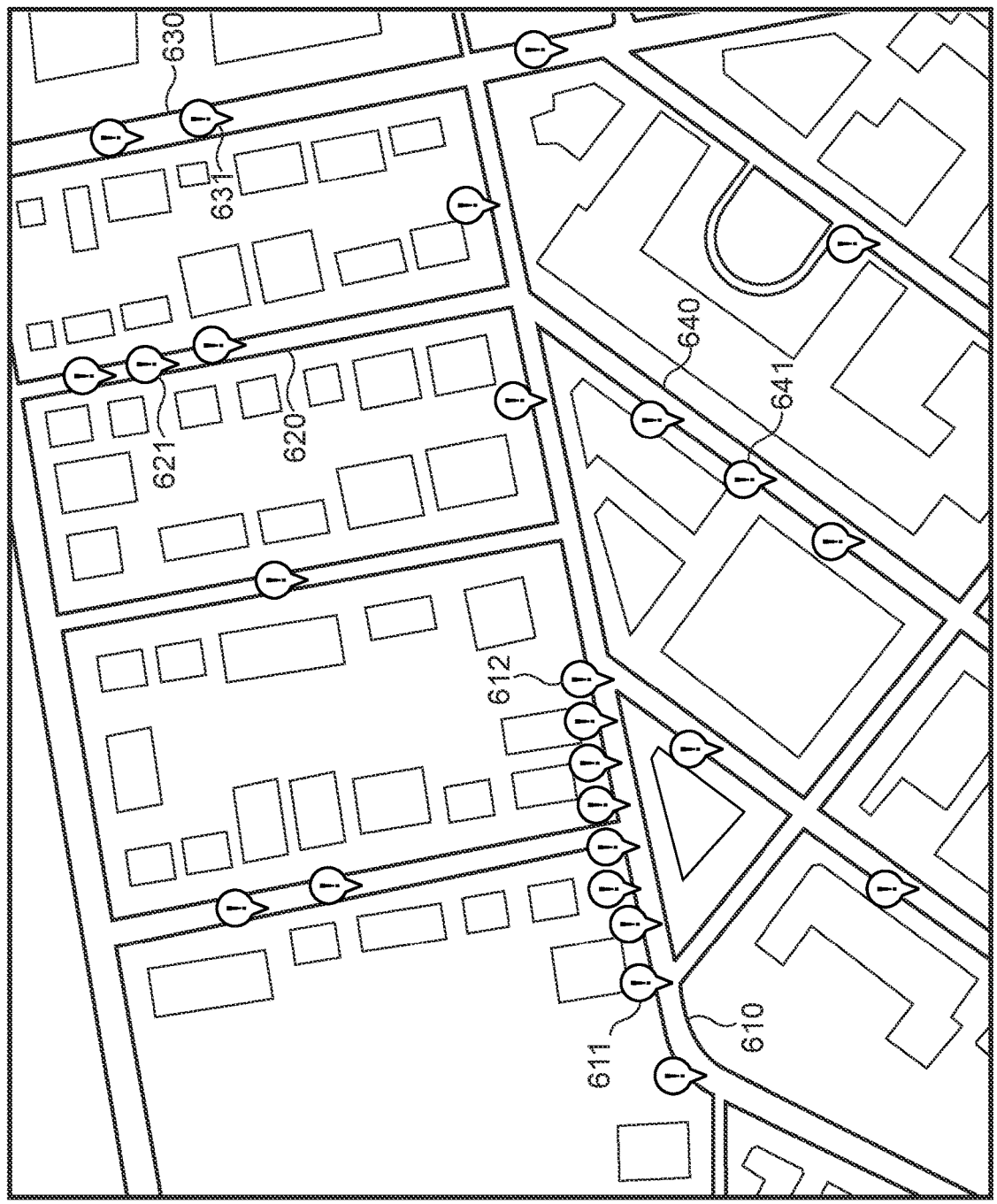
FIG. 6 is a schematic view of an example embodiment of locations of detected anomalies of road conditions.
Figure 7:
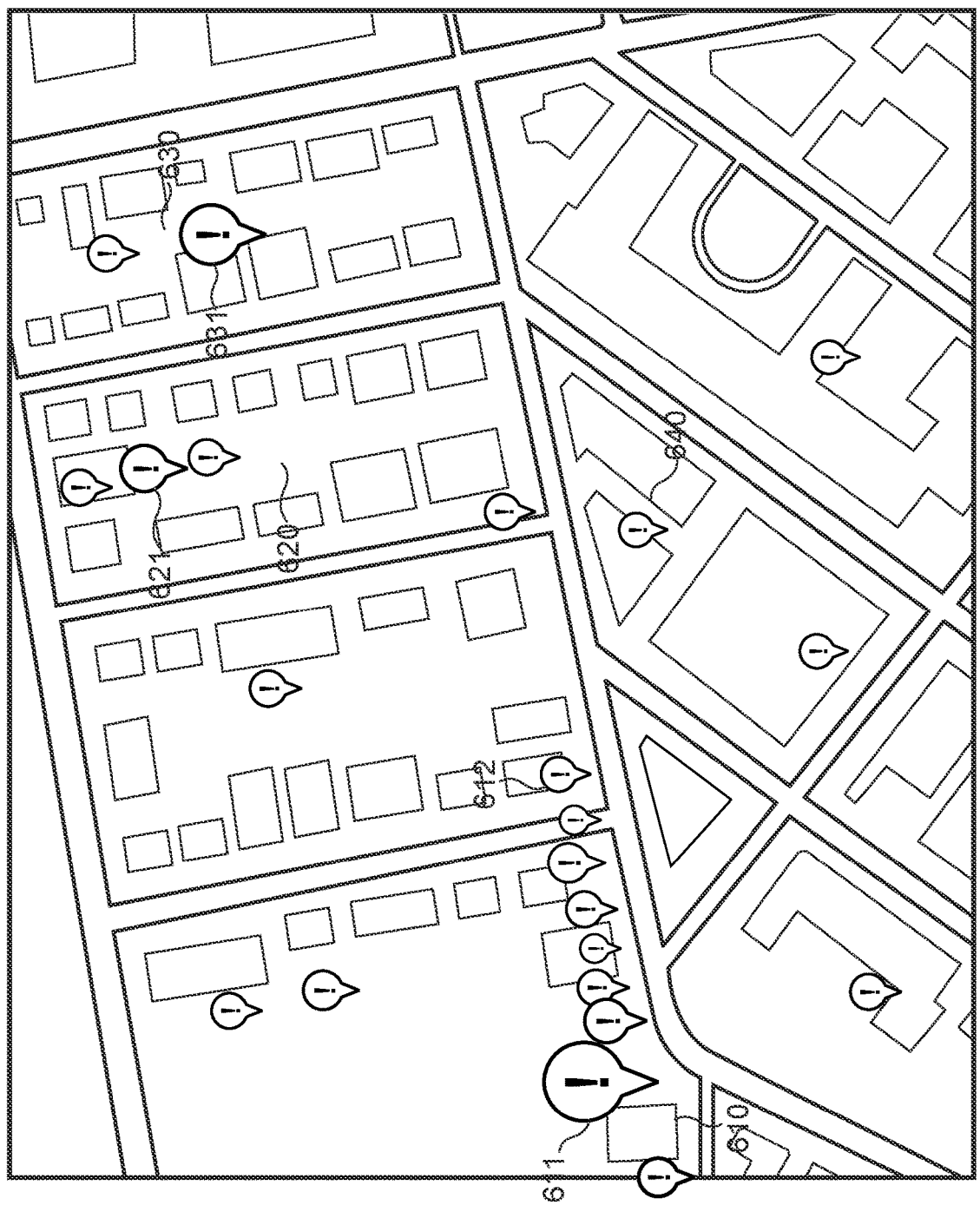
FIG. 7 is a schematic view of an example embodiment of prioritized locations of anomalies of road conditions.

Referring now to FIGS. 6 and 7, an example embodiment of a map 600 of a given geographic area with multiple roads including reported anomalies or road surface irregularities is shown. FIG. 6 is a schematic view of an example embodiment of locations of detected anomalies of road conditions on map 600. As shown in this embodiment, map 600 covers a geographic area that includes a plurality of roads, including roads of different types, classes, or categories.

For example, the geographic area shown in map 600 includes at least a first main road 610, a second main road 630, a first side road 620, and a second side road 640. In this embodiment, main roads (e.g., first main road 610 and second main road 630) may be large roads with multiple lanes in either direction, whereas side roads (e.g., first side road 620 and second side road 640) may be smaller roads, usually single lane roads in either direction. For example, first main road 610 and second main road 630 may be highways, expressways, avenues, etc. with four or more lanes and high speed limits (e.g., 45 mph or greater) and first side road 620 and second side road 640 may be neighborhood streets with two undivided lanes and lower speed limits (e.g., lower than 45 mph).

As shown in FIG. 6, map 600 includes a plurality of locations on the roads that are associated with reports from mobile devices of detected anomalies or road surface irregularities. For example, in this embodiment, first main road 610 is associated with a plurality of anomalies, including at least a first anomaly location 611 and a second anomaly location 612. First side road 620 is also associated with a plurality of anomalies, including at least a third anomaly location 621. Similarly, second main road 630 is associated with a plurality of anomalies, including at least a fourth anomaly location 631, and second side road 640 is also associated with a plurality of anomalies, including at least a fifth anomaly location 641. Thus, as shown in FIG. 6, a plurality of anomalies are shown on map 600 for the geographic area that includes first main road 610, second main road 630, first side road 620, and second side road 640. It should be understood that map 600 includes additional roads and anomaly locations.

As shown in FIG. 6, the anomaly locations for the plurality of roads are shown on map 600. However, in this embodiment, the anomaly locations have not yet been prioritized as described above. As a result, a municipal agent (e.g., municipal agent 350) attempting to schedule road maintenance and/or repairs does not have any context for the urgency or need to repair any particular anomaly location over another.

The techniques described herein provide a mechanism for prioritizing road maintenance and repairs based on the detection information received from mobile devices and/or vehicles. Referring now to FIG. 7, a schematic view of an example embodiment of prioritized locations of anomalies of road conditions is shown. In this embodiment, map 600 includes the plurality of locations on the roads that are associated with reports from mobile devices of detected anomalies or road surface irregularities, as in FIG. 6 above. However, as shown in this embodiment, certain anomalies or road surface irregularities have been prioritized relative to the others, for example, according to operation 512 implemented by server 330, described above.

In this embodiment, first anomaly location 611 on first main road 610 has been determined to have a highest priority for maintenance and/or repair. In an example embodiment, the anomaly locations with higher priority may be shown on map 600 with an indicia that communicates or alerts the higher priority. For example, as shown in FIG. 7, anomaly locations on the roads with higher priority are shown with a correspondingly larger icon, with the size being proportional to the priority (i.e., a larger sized icon represents an anomaly location with higher priority). Accordingly, as shown in FIG. 7, first anomaly location 611 on first main road 610 is indicated on map 600 with a first largest icon.

In this embodiment, other anomaly locations on the roads in the geographic area shown on map 600 have also been prioritized. For example, fourth anomaly location 631 on second main road 630 is indicated on map 600 with a second largest icon. That is, the second largest icon associated with fourth anomaly location 631 is smaller than the first largest icon associated with first anomaly location 611 on first main road 610 to indicate that first anomaly location 611 has a higher priority than fourth anomaly location 631. Fourth anomaly location 631 has a higher priority than the remaining roads in the geographic area shown on map 600. In this embodiment, the anomalies associated with the two main roads (e.g., first anomaly location 611 on first main road 610 and fourth anomaly location 631 on second main road 630) have higher priority than the other anomaly locations on the roads in the geographic area.

Additionally, in this embodiment, third anomaly location 621 on first side road 620 is indicated on map 600 with a next largest icon (i.e., smaller than icons associated with first anomaly location 611 and fourth anomaly location 631, but larger than the remaining icons for the other anomalies. Thus, while third anomaly location 621 on first side road 620 is on a smaller or less busy road than, for example, second anomaly location 612 on first main road 610, the prioritization process (i.e., implemented by server 330, as described above) has been used to determine that third anomaly location 621 on first side road 620 is in more urgent need of repair or maintenance than the remaining anomaly locations.

With this arrangement, road maintenance and/or repairs may be made according to the list of prioritized anomaly or road surface irregularities determined by the system for distributed detection of road conditions and damage according to the example embodiments herein. Thus, roads in a geographic area that are in need of maintenance or repair more urgently than other roads in a geographic area may be prioritized. Accordingly, the process of implementing road maintenance and repairs can be made more efficient and effective than the conventional techniques.

While icons of differing sizes have been shown in FIG. 7 to indicate the level of priority for the various locations, other indicia or techniques may be used in addition and/or in alternative. For example, priority levels or degrees may be indicating using colors, different icons (e.g., representing the type of repair needed), numbers or rankings, different shapes, etc., so that higher priority locations for repairs or maintenance may be distinguished from other anomaly locations.

Figure 8:
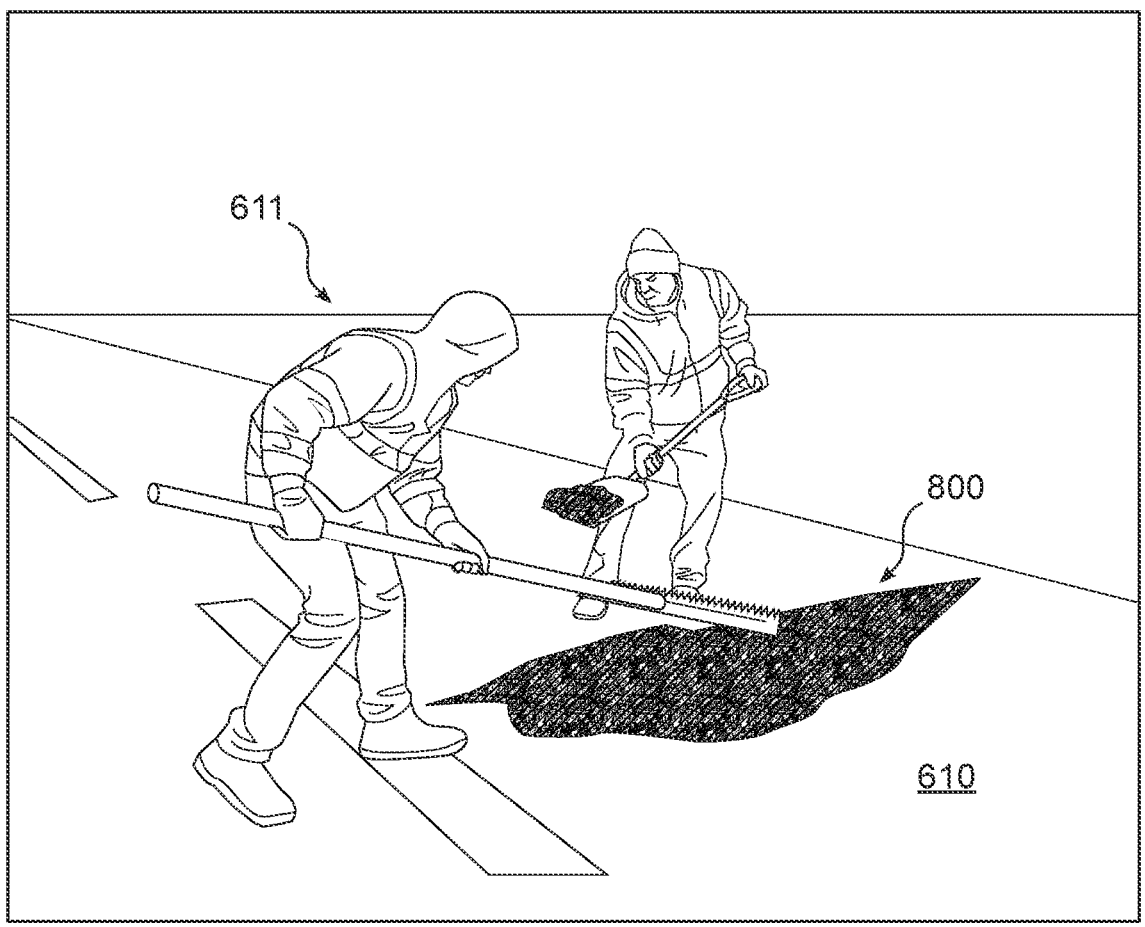
FIG. 8 is a schematic view of an example embodiment of an anomaly in a road being repaired.

Referring now to FIG. 8, a schematic view of an example embodiment of an anomaly in a road being repaired is shown. In this embodiment, the anomaly is at first anomaly location 611 on first main road 610 that has been determined to have the highest priority for maintenance and/or repair, as described above. Accordingly, a work crew may be dispatched, for example, by municipal agent 350, to fix the anomaly or road surface irregularity at first anomaly location 611 on first main road 610. In this case, the anomaly at first anomaly location 611 on first main road 610 is a pothole and the work crew implements the repair by filling the pothole with a patch 800. With this arrangement, work crews may focus on the repairs and/or maintenance of anomalies on roads that have the highest priority (i.e., are the most urgent).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for distributed detection of road conditions and damage, the method comprising:
  receiving, from one or more mobile devices located in vehicles traveling along roads in a geographic area, a plurality of reports of anomalies associated with the roads in the geographic area, wherein each report of an anomaly includes information associated with the anomaly or a road surface irregularity, the information including at least a value of a shock or vibration detected by a sensor associated with the mobile device in the vehicle sending the report;
  storing the received reports of anomalies in a database;
  comparing each report of an anomaly to stored reports of previous anomalies in the database;
  determining whether each report of an anomaly indicates road damage or a temporary problem, wherein determining whether the report of the anomaly indicates road damage or a temporary problem comprises comparing the value of the shock or vibration detected by the sensor associated with the mobile device in the vehicle to a first threshold value;
  upon determining that the value of the shock or vibration does not exceed the first threshold value, proceeding to the next report of an anomaly;
  upon determining that the value of the shock or vibration does exceed the first threshold value, determining that the report of the anomaly indicates road damage; and
  generating a prioritized list of locations of anomalies associated with one or more roads that have been determined to have road damage that needs maintenance or repair.

2. The method according to claim 1, wherein the anomalies associated with the roads in the geographic area include one or more of sinkholes, potholes, road surface irregularities, broken pavement, loose gravel or debris, or other dangerous road conditions or damage.

3. The method according to claim 2, wherein the anomalies further include one or more of curbs, medians, dividers, speed bumps, shoulders, or break down lanes associated with the roads in the geographic area.

4. The method according to claim 1, wherein the sensor associated with the mobile device is an accelerometer.

5. The method according to claim 1, further comprising sending the prioritized list of locations of anomalies to a municipal agent configured to implement maintenance or repair of the roads in the geographic area.

6. The method according to claim 1, wherein determining whether each report of an anomaly indicates road damage or a temporary problem further includes comparing information associated with the received report of an anomaly to a second predetermined threshold value;
  wherein the second predetermined threshold value is at least one of a number of reports or a time-based value.

7. The method according to claim 1, wherein the first predetermined threshold value varies based on a configuration or arrangement of a specific road on which the shock or vibration is detected.

8. The method according to claim 1, wherein the prioritized list of locations of anomalies is prioritized according to at least one of the following factors:
  a number of reports associated with a given location;
  a severity of road damage associated with the anomaly;
  a road type;
  a time associated with the received report; or
  a type of damage associated the anomaly.

9. The method according to claim 1, wherein comparing each report of an anomaly to stored reports of previous anomalies in the database includes determining that multiple anomalies are present at the same location.

10. A method for implementing road maintenance and/or repair of one or more roads in a geographic area, the method comprising:
  receiving, from one or more mobile devices located in vehicles traveling along roads in a geographic area, a plurality of reports of anomalies associated with the one or more roads in the geographic area, wherein each report of an anomaly includes information associated with the anomaly or a road surface irregularity, the information including at least a value of a shock or vibration detected by a sensor associated with the mobile device in the vehicle sending the report;
  determining whether each report of the anomaly indicates road damage or a temporary problem by:
    comparing the value of the shock or vibration detected by the sensor associated with the mobile device in the vehicle to a first threshold value;
    upon determining that the value of the shock or vibration does not exceed the first threshold value, proceeding to the next report of an anomaly;
    upon determining that the value of the shock or vibration does exceed the first threshold value, determining that the report of the anomaly indicates road damage;
  generating a prioritized list of locations of anomalies associated with one or more roads that have been determined to have road damage that needs maintenance or repair;
  providing the prioritized list of locations of anomalies associated with the one or more roads to a municipal agent configured to implement maintenance or repair of the roads in the geographic area; and
  wherein the anomalies associated with the one or more roads are repaired according to the prioritized list of locations such that a highest priority anomaly is repaired prior to a next highest priority anomaly.

11. The method according to claim 10, wherein the prioritized list of locations of anomalies is prioritized according to at least one of the following factors:
  a number of reports associated with a given location;

a severity of road damage associated with the anomaly;
a road type;
a time associated with the received report; or
a type of damage associated the anomaly.

12. The method according to claim 10, wherein the first threshold value varies based on a configuration or arrangement of a specific road on which the shock or vibration is detected.

13. The method according to claim 10, wherein the anomalies associated with the one or more roads include one or more of sinkholes, potholes, road surface irregularities, broken pavement, loose gravel or debris, or other dangerous road conditions or damage.

14. The method according to claim 13, wherein the anomalies further include one or more of curbs, medians, dividers, speed bumps, shoulders, or break down lanes associated with the roads in the geographic area.

15. The method according to claim 10, wherein the prioritized list of locations of anomalies is prioritized according to a policy automatically implemented to apply a weighted set of the following factors:
a number of reports associated with a given location;
a severity of road damage associated with the anomaly;
a road type;
a time associated with the received report; and
a type of damage associated the anomaly.

16. A system for distributed detection of road conditions and damage, the system comprising:
a plurality of mobile devices associated with vehicles traveling along roads in a geographic area, wherein each mobile device includes at least a sensor that measures a shock or vibration;
a server including a processor in communication with the plurality of mobile devices via a communication network;
wherein the processor of the server is configured to:
receive, from the plurality of mobile devices located in the vehicles traveling along the roads in the geographic area, a plurality of reports of anomalies associated with the roads in the geographic area, wherein each report of an anomaly includes information associated with the anomaly or a road surface irregularity, the information including at least a value of a shock or vibration detected by the sensor associated with the mobile device in the vehicle sending the report;
store the received reports of anomalies in a database;
compare each report of an anomaly to stored reports of previous anomalies in the database;
determine whether each report of an anomaly indicates road damage or a temporary problem, wherein determining whether the report of the anomaly indicates road damage or a temporary problem comprises comparing the value of the shock or vibration detected by the sensor associated with the mobile device in the vehicle to a first threshold value;
upon determining that the value of the shock or vibration does not exceed the first threshold value, proceeding to the next report of an anomaly;
upon determining that the value of the shock or vibration does exceed the first threshold value, determining that the report of the anomaly indicates road damage; and
generate a prioritized list of locations of anomalies associated with one or more roads that have been determined to have road damage that needs maintenance or repair.

17. The system according to claim 16, further comprising:
a municipal agent in communication with the server via the communication network, wherein the municipal agent is configured to implement maintenance and/or repair of the roads in the geographic area; and
wherein the processor of the server is further configured to send the prioritized list of locations of anomalies to the municipal agent.

18. The system according to claim 16, wherein the sensor associated with the mobile device is an accelerometer.

19. The system according to claim 16, wherein the prioritized list of locations of anomalies is prioritized according to at least one of the following factors:
a number of reports associated with a given location;
a severity of road damage associated with the anomaly;
a road type;
a time associated with the received report; or
a type of damage associated the anomaly.

20. The system according to claim 16, wherein the processor of the server is further configured to determine whether each report of an anomaly indicates road damage or a temporary problem by comparing information associated with the received report of an anomaly to a second predetermined threshold value; and
wherein the second predetermined threshold value is at least one of a number of reports or a time-based value.

* * * * *